(12) United States Patent
Tanaka et al.

(10) Patent No.: US 10,030,634 B2
(45) Date of Patent: Jul. 24, 2018

(54) WIND POWER GENERATION SYSTEM

(71) Applicant: Kabushiki Kaisha Toshiba, Minato-ku (JP)

(72) Inventors: Motofumi Tanaka, Yokohama (JP); Shinya Nakayama, Yamato (JP); Haruhisa Wada, Yokohama (JP); Naoto Shinohara, Kawasaki (JP); Shigeo Maezawa, Yokohama (JP); Toshiki Osako, Kawasaki (JP); Satoshi Hanai, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 190 days.

(21) Appl. No.: 15/075,781

(22) Filed: Mar. 21, 2016

(65) Prior Publication Data

US 2016/0290321 A1    Oct. 6, 2016

(30) Foreign Application Priority Data

Mar. 31, 2015    (JP) ................. 2015-074225

(51) Int. Cl.
*F03D 80/30*    (2016.01)
*F03D 7/02*    (2006.01)
(Continued)

(52) U.S. Cl.
CPC ............ *F03D 80/30* (2016.05); *F03D 7/022* (2013.01); *F03D 9/25* (2016.05); *H05F 3/00* (2013.01); *Y02E 10/721* (2013.01); *Y02E 10/723* (2013.01)

(58) Field of Classification Search
CPC ......... H01L 2924/0002; H01L 2924/00; H05F 3/04; H05F 3/052
(Continued)

(56) References Cited

U.S. PATENT DOCUMENTS 8,456,790 B2 *   6/2013   Tanaka .................... F03D 7/022
                                                             361/111
2012/0287549 A1    11/2012   Tanaka et al.

FOREIGN PATENT DOCUMENTS

CN            1867772 A     11/2006
DE     10 2011 014 537 B3     5/2012
(Continued)

OTHER PUBLICATIONS

Hansen: WO 2005/026538; Publication Date: Mar. 24, 2015; Hansen; A method of light proofing a blad for a wind energy plant.*
(Continued)

*Primary Examiner* — Dharti Patel
(74) *Attorney, Agent, or Firm* — Oblon, McClelland, Maier & Neustadt, L.L.P.

(57) ABSTRACT

A wind power generation system according to an embodiment includes a blade; a lightning protection device; an electric device; a voltage application mechanism; a first lightning arrester element; and a second lightning arrester element. The lightning protection device includes a receptor provided at the blade and guides a current of lightning to the ground from the receptor via a lightning conductor. The electric device is installed at the blade and includes a first electric conductor and a second electric conductor provided apart from each other. The voltage application mechanism applies a voltage between the first electric conductor and the second electric conductor. The first lightning arrester element has one end thereof electrically connected to the first electric conductor and has the other end thereof grounded. The second lightning arrester element has one end thereof electrically connected to the second electric conductor and has the other end thereof grounded.

4 Claims, 4 Drawing Sheets

(51) Int. Cl.
*H05F 3/00* (2006.01)
*F03D 9/25* (2016.01)

(58) Field of Classification Search
USPC .................................................. 361/131, 220
See application file for complete search history.

(56) References Cited

FOREIGN PATENT DOCUMENTS

| | | |
|---|---|---|
| EP | 2 522 852 A1 | 11/2012 |
| JP | 53-129868 A | 11/1978 |
| JP | 2001-211544 A | 8/2001 |
| JP | 2008-25434 | 2/2008 |
| JP | 2012-255431 A | 12/2012 |
| JP | 5657597 | 1/2015 |
| WO | WO 00/79128 A1 | 12/2000 |
| WO | WO 2012/126558 A1 | 9/2012 |

OTHER PUBLICATIONS

Office Action dated Apr. 17, 2018, in Japanese Patent Application No. 2015-074225, filed Mar. 31, 2015, w/English-language Translation.

Office Action dated Apr. 2, 2018, in Chinese Patent Application No. 201610085611.X, w/English-language Translation.

* cited by examiner

WIND POWER GENERATION SYSTEM

CROSS REFERENCE TO RELATED APPLICATIONS

This application is based upon and claims the benefit of priority from the prior Japanese Patent Application No. 2015-074225, filed on Mar. 31, 2015; the entire contents of which are incorporated herein by reference.

FIELD

Embodiments described herein relate generally to a wind power generation system.

BACKGROUND

Currently, in view of global warming prevention, introduction of renewable energy power generation systems is in progress in the global scale. A wind power generation system is one of the renewable energy power generation systems that are being popularized, and performs power generation using wind power energy. However, in Japan, the popularization rate of the wind power generation system is low as compared to that in Europe or the like.

The reason for the low popularization rate of the wind power generation system in Japan is largely because of its geographical constraints. In Japan, wind force change and wind direction change are large due to the mountain climate, thereby making it difficult to stably maintain outputs in wind power generation. Such factors cause decrease in power generation efficiency per windmill, and consequently raise introduction costs of the wind power generation system.

In order to introduce a large-scale wind power generation system in a region where wind speed and wind direction change rapidly like in Japan, the above-described problems need to be overcome. That is, it becomes necessary to develop windmills that are variation resistant. Accordingly, in order to deal with the wind speed and wind direction changes, it is proposed that an airflow generation device to generate a plasma induced flow (airflow) should be disposed on a blade surface of a windmill. The airflow generation device includes a dielectric provided between a pair of electrodes, and applying a voltage between the pair of electrodes makes the airflow generation device generate the plasma induced flow.

In the wind power generation system, in addition to the airflow generation device, electric devices such as a heating device and an acoustic generation device are sometimes installed at the blade of the windmill. The heating device is installed at the blade of the windmill in order to melt ice adhering to the blade, for example. Further, the acoustic generation device is installed at the blade of the windmill in order to suppress vibrations, for example.

The wind power generation system is high in height, and therefore the blade and the like of the windmill are frequently struck by lightning. Therefore, when lightning strikes, there is sometimes a case that a current of lightning (surge current) flows into the electric device installed at the blade and the electric device is damaged. When the airflow generation device is installed at the blade, for example, a current of lightning flows into the electrodes formed of a metal material in the airflow generation device, and thereby the electrodes are damaged. Further, by a current of lightning, a power supply electrically connected to the electrodes of the airflow generation device is sometimes damaged. Additionally, there is a possibility that a portion near the position where the airflow generation device is installed at the blade is damaged by a current of lightning. Here, as the current of lightning, not only a current by a direct lightning strike, meaning that lightning directly strikes the electric device, but also a current by induced lightning to flow into the electric device by electromagnetic induction when lightning directly strikes a portion other than the electric device, for example, a lightning receiving part provided at the blade, a tower, or the like is included.

Therefore, in the wind power generation system, it is necessary to accurately protect the electric device and the like installed at the blade from lightning strikes. That is, it is necessary to prepare highly reliable measures against lightning.

Thus, a problem to be solved by the present invention is to provide a wind power generation system capable of accurately protecting electric devices and the like installed at a blade from lightning strikes and capable of improving safety.

DETAILED DESCRIPTION

A wind power generation system according to an embodiment includes: a blade; a lightning protection device; an electric device; a voltage application mechanism; a first lightning arrester element; and a second lightning arrester element. The lightning protection device includes a receptor provided at the blade and guides a current of lightning to the ground from the receptor via a lightning conductor. The electric device is installed at the blade and includes a first electric conductor and a second electric conductor provided apart from each other. The voltage application mechanism applies a voltage between the first electric conductor and the second electric conductor. The first lightning arrester element has one end thereof electrically connected to the first electric conductor and has the other end thereof grounded. The second lightning arrester element has one end thereof electrically connected to the second electric conductor and has the other end thereof grounded.

There will be explained an embodiment with reference to the drawings.

[A] Constitution of Wind Power Generation System 10

Figure 1:
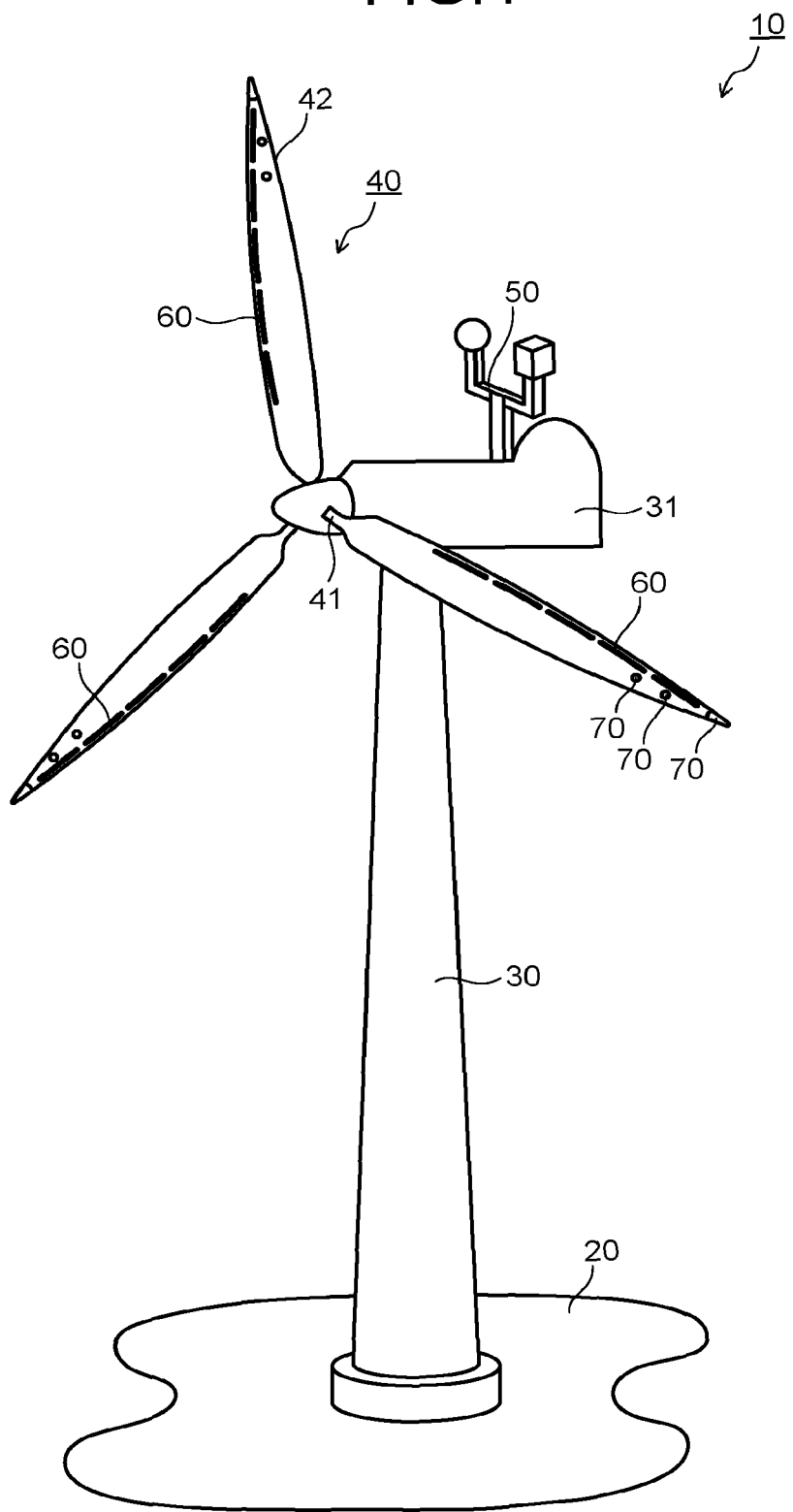
FIG. 1 is a perspective view schematically illustrating a substantial part of a wind power generation system according to an embodiment.

FIG. 1 is a perspective view schematically illustrating a substantial part of a wind power generation system 10 according to the embodiment.

The wind power generation system 10 is a propeller windmill and includes: a tower 30; a nacelle 31; a rotor 40; and an aerovane 50 as illustrated in FIG. 1. Additionally, the wind power generation system 10 includes: airflow generation devices 60 (electric devices); and receptors 70.

Respective parts constituting the wind power generation system 10 will be explained sequentially.

[A-1] Tower 30

In the wind power generation system 10, the tower 30 extends along a vertical direction as illustrated in FIG. 1 and has a lower end portion thereof fixed to a ground 20.

[A-2] Nacelle 31

In the wind power generation system 10, the nacelle 31 is installed at an upper end portion of the tower 30 as illustrated in FIG. 1. The nacelle 31 is supported on the upper end portion of the tower 30 so as to be rotatable about a vertical-direction axis in order to adjust a yaw angle.

[A-3] Rotor 40

In the wind power generation system 10, the rotor 40 is rotatably supported on the nacelle 31 and rotates about a horizontal-direction rotation axis as illustrated in FIG. 1. The rotor 40 is connected to a power generator (whose illustration is omitted) housed in the nacelle 31 and by rotations of the rotor 40, the power generator is driven and thereby power generation is performed.

As illustrated in FIG. 1, the rotor 40 includes a hub 41 and a plurality of blades 42, and the plural blades 42 are installed at the hub 41. The plural blades 42 are attached around the hub 41 so as to be apart from one another in a rotation direction. For example, three pieces of the blades 42 are provided. Each of the three blades 42 has one end thereof that is positioned on the blade root side rotatably supported by the hub 41 for the purpose of adjusting a pitch angle.

[A-4] Aerovane 50

In the wind power generation system 10, the aerovane 50 is attached to an upper surface of the nacelle 31 as illustrated in FIG. 1. The aerovane 50 measures wind speed and wind direction and outputs measured data to a control unit (whose illustration is omitted). Then, according to the measured data, the control unit adjusts the yaw angle and the pitch angle. Further, according to the measured data, the control unit controls operations of discharge power supplies (whose illustrations are omitted), to thereby control operations of the airflow generation devices 60.

[A-5] Airflow Generation Device 60 and Receptor 70

In the wind power generation system 10, the airflow generation devices 60 and the receptors 70 are installed at the blades 42 as illustrated in FIG. 1.

Figure 2:
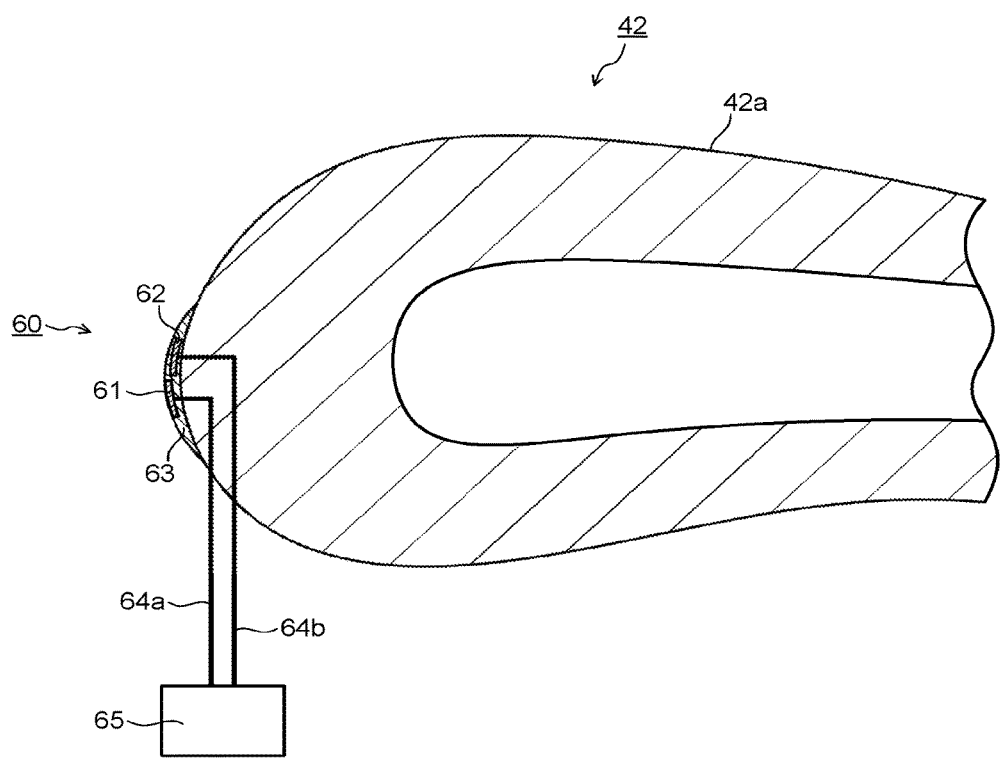
FIG. 2 is a view illustrating a part at which an airflow generation device is installed in the wind power generation system according to the embodiment in an enlarged manner.

FIG. 2 is a view illustrating a part at which the airflow generation device 60 is installed in the wind power generation system 10 according to the embodiment in an enlarged manner. FIG. 2 is a cross-sectional view illustrating a front edge portion of the blade 42 in an enlarged manner.

Figure 3:
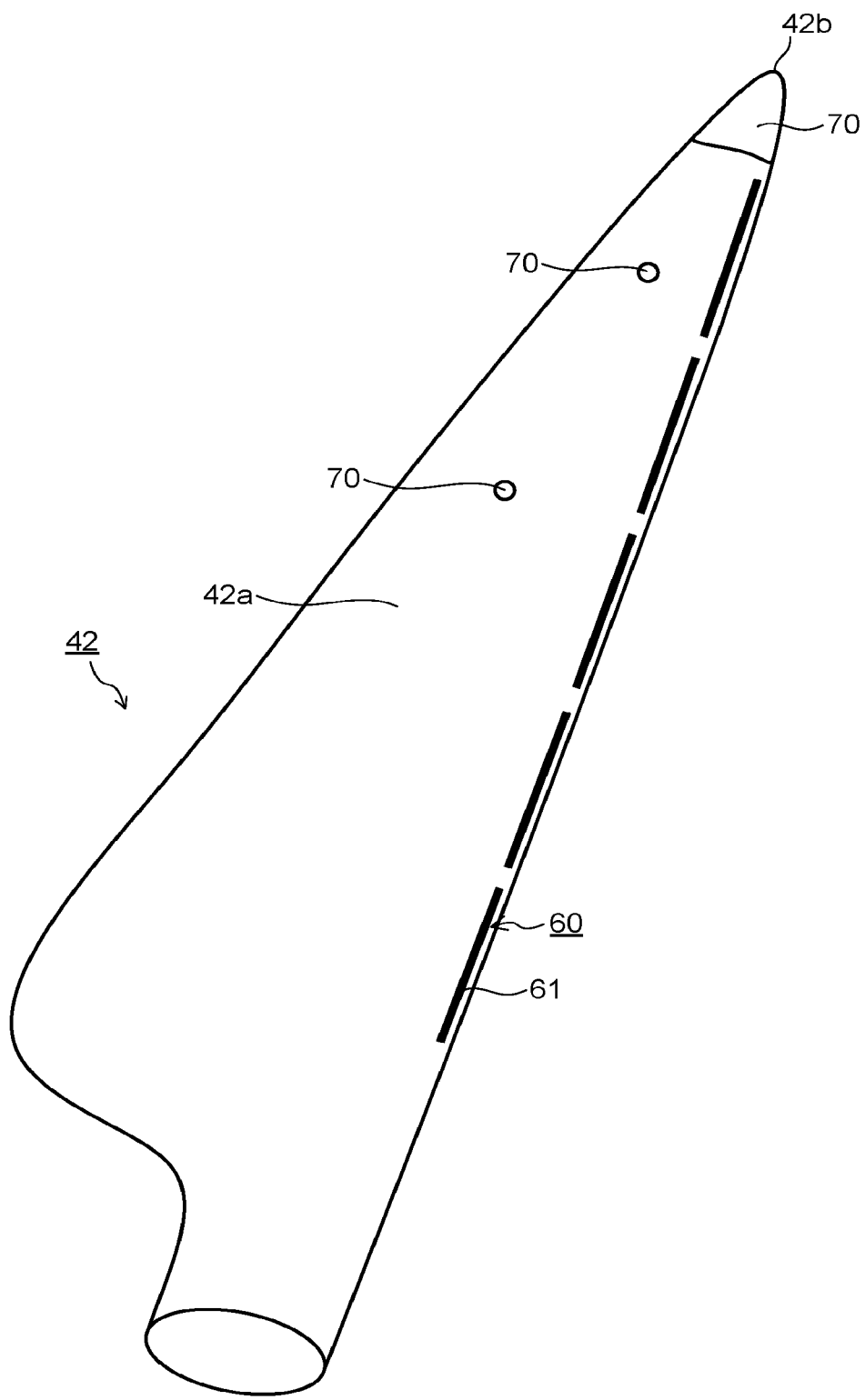
FIG. 3 is a view illustrating a part at which the airflow generation devices and receptors are installed in the wind power generation system according to the embodiment in an enlarged manner.

FIG. 3 is a view illustrating a part at which the airflow generation devices 60 and the receptors 70 are installed in the wind power generation system 10 according to the embodiment in an enlarged manner. FIG. 3 is a perspective view illustrating the single blade 42 in an enlarged manner. FIG. 3 illustrates a back-side surface of the blade 42.

[A-5-1] Airflow Generation Device 60

The airflow generation device 60 is installed at the blade 42 as illustrated in FIG. 2. The airflow generation device 60 includes: a first electrode 61 (first electric conductor); a second electrode 62 (second electric conductor); and a dielectric 63.

As illustrated in FIG. 2, in the airflow generation device 60, the first electrode 61 is provided on a surface of the dielectric 63. The second electrode 62 is provided inside the dielectric 63. The dielectric 63 lies between the first electrode 61 and the second electrode 62. The first electrode 61 and the second electrode 62 are each formed of a conductive material such as a metal material.

In the airflow generation device 60, the dielectric 63 is formed of a dielectric material. The dielectric material forming the dielectric 63 can be used by appropriately selecting from dielectric materials made of solid, according to the purpose and environment of its use, and may also be used by combining a plurality of kinds of dielectric materials.

As illustrated in FIG. 2, a first cable 64a is connected to the first electrode 61. Then, a second cable 64b is connected to the second electrode 62. The first cable 64a and the second cable 64b each have a portion housed inside the blade 42 and are electrically connected to a discharge power supply 65 (voltage application mechanism). In the airflow generation device 60, the discharge power supply 65 applies a voltage between the first electrode 61 and the second electrode 62 via the first cable 64a and the second cable 64b, and thereby a plasma induced flow is generated.

In the airflow generation device 60, for example, a pulse modulation controlled voltage in a pulse form (positive, negative, or bipolar (alternate voltage)) and a voltage having a waveform in an alternate form (sinusoidal wave or intermittent sinusoidal wave) are applied between the first electrode 61 and the second electrode 62 by the discharge power supply 65. Here, the discharge power supply 65 applies the voltage between the first electrode 61 and the second electrode 62 while varying current-voltage properties such as voltage value, frequency, current waveform, and duty ratio. The detailed constitution of the discharge power supply 65 will be described later.

The airflow generation device 60 is disposed at the blade 42 so that the plasma induced flow flows from the front edge of the blade 42 toward a back side 42a of the blade 42. Here, as illustrated in FIG. 2, the airflow generation device 60 is disposed so that for example, one end of the first electrode 61 positioned on the second electrode 62 side agrees with the front edge of the blade 42 and the second electrode 62 is positioned on the back side 42a of the blade 42 rather than the first electrode 61.

As illustrated in FIG. 3, the plural airflow generation devices 60 are installed on the surface of the blade 42 so as to be arranged in a blade span direction. The airflow generation devices 60 are installed so that an extension direction of the first electrode 61 and the second electrode 62 is along the blade span direction.

The plural airflow generation devices 60 arranged in the blade span direction are electrically connected to, for example, the plural discharge power supplies 65 respectively, and their operations are controlled independently of one another. That is, conditions (peak value, frequency, waveform, modulation frequency, duty ratio, and the like) of a voltage applied between the first electrode 61 and the second electrode 62 are controlled independently for each of the plural airflow generation devices 60 arranged in the blade span direction. Incidentally, as long as each of the plural airflow generation devices 60 is a power supply provided with a function capable of controlling voltage independently, the plural airflow generation devices 60 do not have to be provided, but the single airflow generation device 60 is enough.

The disposition of the airflow generation devices 60 is not limited to the above-described case particularly. The airflow generation devices 60 are preferably installed at a position where they can control separated flow and the like to generate on the surface of the blade 42. For example, the airflow generation devices 60 are preferably disposed at the front edge portion of the blade 42 as described above.

In addition to the above, the airflow generation devices 60 may also be installed so as to fit in a trench (not illustrated) formed in the blade 42, for example. That is, the airflow generation devices 60 may also be installed so as not to have a portion projecting from the surface of the blade 42.

Besides, the airflow generation devices 60 may also be formed directly in the blade 42. In this case, the airflow generation devices 60 are provided in a way that the blade 42 is formed so that a part constituting the blade 42 functions as the above-described dielectric 63. When the blade 42 is formed of, for example, a dielectric material such as GFRP (glass fiber reinforced plastics) in which strength of a synthetic resin is reinforced with glass fibers, the airflow generation devices 60 can be formed directly in the blade 42.

In the above, the case where the plural airflow generation devices 60 are installed in the blade span direction has been explained, but this is not restrictive. When the blade span is small, for example, in the blade span direction, the plural airflow generation devices 60 are not installed, but the single airflow generation device 60 may also be installed.

[A-5-2] Receptor 70

In the wind power generation system 10, as illustrated in FIG. 1 and FIG. 3, the receptors 70 are installed at the blades 42. The receptors 70 are provided to guide lightning so as to prevent the lightning from striking an unintended portion of the blade 42 and to prevent the blade 42 from being damaged due to the lightning.

Here, the plural receptors 70 are installed at the single blade 42. Specifically, the receptors 70 are installed at a tip portion 42b of the blade 42. Further, as illustrated in FIG. 1 and FIG. 3, the receptors 70 are installed at a portion positioned at the tip portion 42b side on each of a belly-side surface (see FIG. 1) and a back-side surface (see FIG. 3) of the blade 42.

The receptor 70 is preferably made of, for example, a metal material that is small in melting amount when struck by lightning. The receptor 70 is formed using a metal material such as, for example, a copper-tungsten alloy or aluminum.

The receptor 70 constitutes a lightning protection device (whose illustration is omitted) and the lightning protection device is constituted so that a current of the lightning striking the receptor 70 is guided to the ground, which will be described in detail later.

[B] Electric Wiring System of the Wind Power Generation System 10

Hereinafter, there will be explained an electric wiring system of the wind power generation system 10 according to the embodiment.

Figure 4:
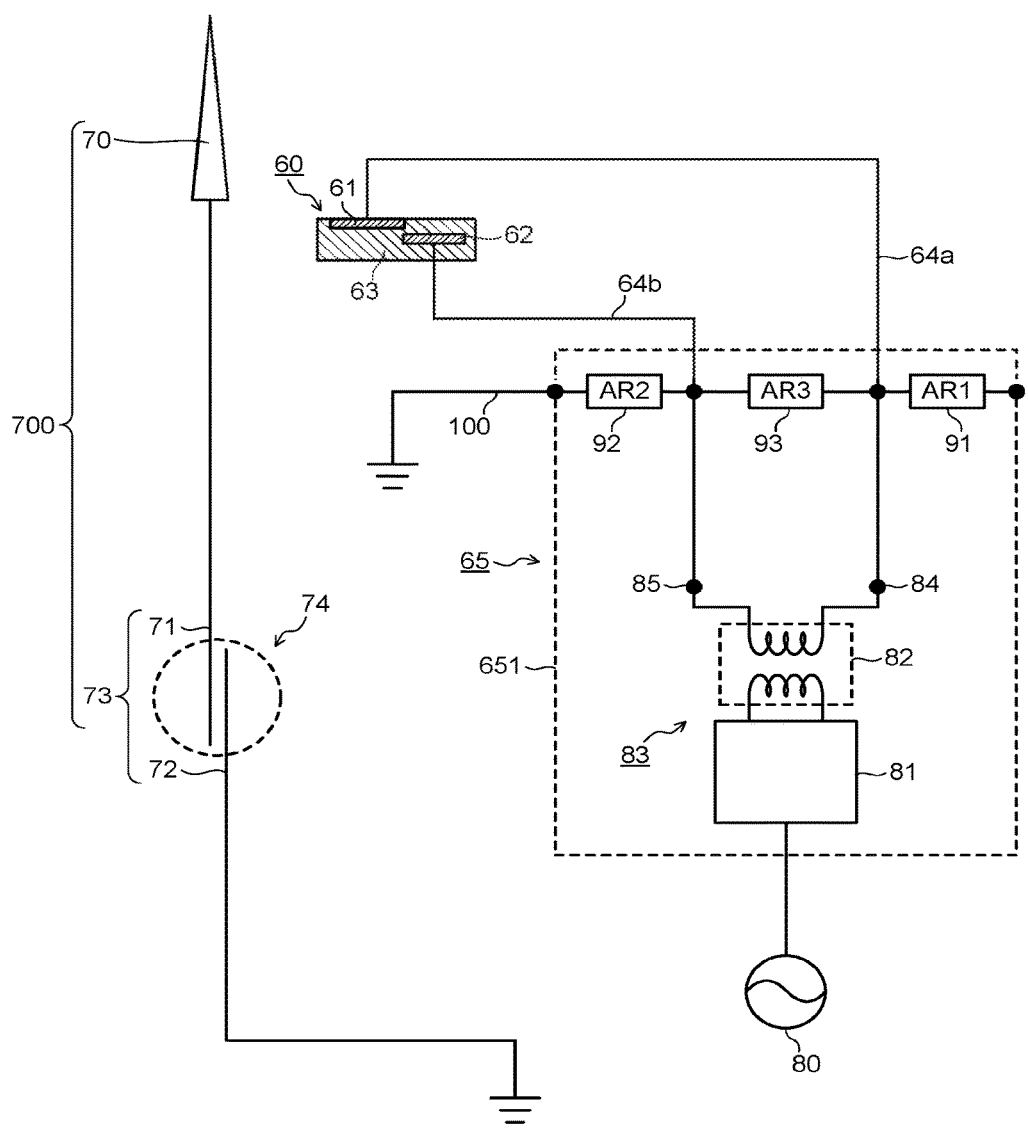
FIG. 4 is a diagram schematically illustrating an electric wiring system of the wind power generation system according to the embodiment.

FIG. 4 is a diagram schematically illustrating the electric wiring system of the wind power generation system 10 according to the embodiment.

As illustrated in FIG. 4, in the wind power generation system 10, a lightning protection device 700 including the above-described receptor 70 is provided. Additionally, in the wind power generation system 10, the discharge power supply 65 to supply power to the airflow generation device 60 is provided.

The lightning protection device 700 and the discharge power supply 65 will be explained sequentially.

[B-1] Lightning Protection Device 700

The lightning protection device 700 includes a lightning conductor 73 in addition to the above-described receptor 70 as illustrated in FIG. 4. In the lightning protection device 700, the receptor 70 is electrically connected to the lightning conductor 73 to be grounded via the lightning conductor 73.

In the lightning protection device 700, the lightning conductor 73 includes: a cable 71; a pull-down conductor 72; and a connection part 74. The lightning conductor 73 has the cable 71 and the pull-down conductor 72 electrically connected to each other via the connection part 74.

In the lightning conductor 73, the cable 71 has one end thereof electrically connected to the receptor 70 and has the other end thereof electrically connected to the connection part 74. The cable 71 is disposed inside a rotation body such as the rotor 40 (see FIG. 1) including the hub 41 and the blades 42, for example, of which illustration is omitted. The cable 71 is positioned at a substantially equal distance away from the first cable 64a and the second cable 64b each inside the rotation body such as the rotor 40 (see FIG. 1) including the hub 41 and the blades 42, of which illustration is omitted.

In the lightning conductor 73, the pull-down conductor 72 has one end thereof electrically connected to the connection part 74 and has the other end thereof grounded. The other end of the pull-down conductor 72 is buried in the underground, for example. The pull-down conductor 72 is disposed inside a stationary body such as the nacelle 31 or the tower 30, for example.

In the lightning conductor 73, the connection part 74 includes a brush, a discharge gap, and the like, for example, and electrically connects the cable 71 disposed in the rotation body and the pull-down conductor 72 disposed in the stationary body.

A large current as high as several ten kA flows through the lightning conductor 73 at the time of a lightning strike. Therefore, the cable 71 and the pull-down conductor 72 constituting the lightning conductor 73 are designed to have a conductor diameter so that they can fully endure the large current. Further, connection resistance at the connection part 74 is designed to be low enough.

[B-2] Discharge Power Supply 65

[B-2-1] Voltage Application Unit 83

The discharge power supply 65 includes a voltage application unit 83 as illustrated in FIG. 4. The voltage application unit 83 includes an oscillator 81 and a transformer 82 to be housed in a casing 651. Incidentally, the oscillator 81 and the transformer 82 may also be housed in different casings individually.

In the voltage application unit 83, the oscillator 81 is electrically connected to a primary power supply 80 and receives power supplied from the primary power supply 80 to output a high-frequency voltage.

In the voltage application unit 83, the transformer 82 (transformer) has an input-side primary coil electrically connected to the oscillator 81 and has an output-side secondary coil electrically connected to the airflow generation device 60. The transformer 82 receives the high-frequency voltage from the oscillator 81 to transform the received high-frequency voltage.

The voltage application unit 83 includes a first output terminal 84 and a second output terminal 85. The first output terminal 84 is electrically connected to the first electrode 61 of the airflow generation device 60 via the first cable 64a. The second output terminal 85 is electrically connected to the second electrode 62 of the airflow generation device 60 via the second cable 64b. The voltage application unit 83 applies the voltage transformed by the transformer 82 between the first electrode 61 and the second electrode 62 via the first output terminal 84 and the second output terminal 85.

A grounding conductor 100 is electrically connected to the casing 651. Here, the grounding conductor 100 has one end thereof electrically connected to the casing 651 and has the other end thereof grounded. The grounding conductor 100 is preferably provided as a separate system from the lightning conductor 73. That is, the grounding conductor 100 and the lightning conductor 73 preferably form grounding systems independent of each other. Incidentally, in an electrical path of the grounding conductor 100, an electrical connection part such as a brush or a discharge gap may also lie, similarly to the connection part 74 of the lightning conductor 73.

[B-2-2] First Lightning Arrester Element 91, Second Lightning Arrester Element 92, and Third Lightning Arrester Element 93

The discharge power supply 65 includes a first lightning arrester element 91, a second lightning arrester element 92, and a third lightning arrester element 93, in addition to the voltage application unit 83 as illustrated in FIG. 4. The first lightning arrester element 91, the second lightning arrester element 92, and the third lightning arrester element 93 are each housed in the casing 651. The first lightning arrester element 91, the second lightning arrester element 92, and the third lightning arrester element 93 each are a surge protector.

The first lightning arrester element 91 is a lightning arrester element to ground, and as illustrated in FIG. 4, has one end thereof (left end in FIG. 4) electrically connected to the first electrode 61 and has the other end thereof (right end in FIG. 4) grounded. Here, one end of the first lightning arrester element 91 is electrically connected to the first electrode 61 of the airflow generation device 60 via the first cable 64a. Then, the other end of the first lightning arrester element 91 is grounded via the casing 651 having the grounding conductor 100 electrically connected thereto. The first lightning arrester element 91 is provided in order to protect the transformer 82 of the voltage application unit 83 from lightning strikes.

The second lightning arrester element 92 is a lightning arrester element to ground, and as illustrated in FIG. 4, has one end thereof (right end in FIG. 4) electrically connected to the second electrode 62 and has the other end thereof (left end in FIG. 4) grounded. Here, one end of the second lightning arrester element 92 is electrically connected to the second electrode 62 of the airflow generation device 60 via the second cable 64b. Then, the other end of the second lightning arrester element 92 is grounded via the casing 651 having the grounding conductor 100 electrically connected thereto. The second lightning arrester element 92 is provided in order to protect the transformer 82 of the voltage application unit 83 from lightning strikes, similarly to the first lightning arrester element 91.

The third lightning arrester element 93 is a line-to-line lightning arrester element, and as illustrated in FIG. 4, has one end thereof (right end in FIG. 4) electrically connected to the first electrode 61 and has the other end thereof (left end in FIG. 4) electrically connected to the second electrode 62. Here, one end of the third lightning arrester element 93 is electrically connected to the first electrode 61 of the airflow generation device 60 via the first cable 64a. Then, the other end of the third lightning arrester element 93 is electrically connected to the second electrode 62 of the airflow generation device 60 via the second cable 64b The third lightning arrester element 93 is provided in order to protect the airflow generation device 60 from lightning strikes.

The first lightning arrester element 91, the second lightning arrester element 92, and the third lightning arrester element 93 each have a unique impulse operating voltage. When an applied voltage to be applied to their ends is equal to or more than the impulse operating voltage, the first lightning arrester element 91, the second lightning arrester element 92, and the third lightning arrester element 93 each operate to turn into a continuity state, and when the above applied voltage is less than the impulse operating voltage, they maintain an insulating state. An impulse operating voltage V91$i$ of the first lightning arrester element 91 and an impulse operating voltage V92$i$ of the second lightning arrester element 92 are preferably the same as each other (namely, V91$i$=V92$i$). Further an impulse operating voltage V93$i$ of the third lightning arrester element 93 is lower than the impulse operating voltage V91$i$ of the first lightning arrester element 91 and the impulse operating voltage V92$i$ of the second lightning arrester element 92 (namely, V91$i$=V92$i$>V93$i$).

Besides, the first lightning arrester element 91 and the second lightning arrester element 92 are each constituted so as not to turn into a continuity state from an insulating state in the case of a normal operating voltage Vope that the discharge power supply 65 applies between the first electrode 61 and the second electrode 62 when making the airflow generation device 60 generate an airflow, but to turn into a continuity state from an insulating state when the voltage to be applied is less than an impulse withstand voltage of the transformer 82. Then, the third lightning arrester element 93 is constituted so as not to turn into a continuity state from an insulating state in the case of the normal operating voltage Vope that the discharge power supply 65 applies when making the airflow generation device 60 generate an airflow, but to turn into a continuity state from an insulating state when the voltage to be applied is less than an impulse withstand voltage of the airflow generation device 60.

Incidentally, the first lightning arrester element 91, the second lightning arrester element 92, and the third lightning arrester element 93 each are preferably a spatial sphere gap arrester in which a pair of spheres is held with a gap provided therebetween. The spatial sphere gap arrester has a large area of a uniform electric field in the gap and has a small variation in the operating voltage even when the surface of the sphere becomes rough due to a lightning strike as compared to a needle gap arrester. Further, the spatial sphere gap arrester has a small effect of an electric field distortion on an end portion as compared to a plate gap arrester.

As illustrated in FIG. 4, when the first lightning arrester element 91, the second lightning arrester element 92, and the third lightning arrester element 93 housed in the casing 651 of the discharge power supply 65 each are a spatial sphere gap arrester, an insulator partition wall is preferably provided around the spheres of the spatial sphere gap arrester. This makes it possible to prevent discharge from generating from the spheres of the spatial sphere gap arrester to the casing.

Besides, a solid-state gap arrester in which an insulator to cause dielectric breakdown by a predetermined voltage is put in a gap may also be used as each of the first lightning arrester element 91, the second lightning arrester element 92, and the third lightning arrester element 93.

[C] Operation

There will be hereinafter explained an operation of the wind power generation system 10 according to the embodiment.

Here, the case of the wind power generation system 10 to operate normally, the case when a thundercloud has approached the wind power generation system 10, and the case when the receptor 70 of the wind power generation system 10 has received lightning will be explained sequentially with reference to FIG. 4.

[C-1] Case of the Wind Power Generation System 10 to Operate Normally

First, operations of the respective parts when the wind power generation system 10 operates normally will be explained. That is, the case when the receptor 70 is not struck by lightning, which is a state where a thundercloud does not approach the wind power generation system 10, will be explained.

In this case, the first lightning arrester element 91, the second lightning arrester element 92, and the third lightning arrester element 93 each do not operate and are in an insulating state because the voltage to be applied is less than the impulse operating voltage. The first electrode 61 of the airflow generation device 60 and the first output terminal 84 of the voltage application unit 83 are in an electrically connected state. Additionally, the second electrode 62 of the airflow generation device 60 and the second output terminal 85 of the voltage application unit 83 are in an electrically connected state. Therefore, the voltage application unit 83 applies a voltage between the first electrode 61 and the second electrode 62, and the airflow generation device 60 is in a state to be able to perform an operation of generating an airflow.

The casing 651 of the discharge power supply 65 is grounded via the grounding conductor 100 to have a ground potential. In contrast to this, an ungrounded state is made between the secondary side of the transformer 82 and the airflow generation device 60, and a floating potential exists therebetween. That is, the first cable 64a electrically connecting the first electrode 61 and the first output terminal 84 has a floating potential. Then, the second cable 64b electrically connecting the second electrode 62 and the second output terminal 85 has a floating potential.

The voltage application unit 83 applies a voltage between the first electrode 61 and the second electrode 62 in the above-described state, to thereby make the airflow generation device 60 generate an airflow.

Specifically, in the voltage application unit 83, power is supplied to the oscillator 81 from the primary power supply 80 and the oscillator 81 outputs a high-frequency voltage to the transformer 82. Then, the transformer 82 transforms the high-frequency voltage. Then, the high-frequency voltage transformed by the transformer 82 is applied between the first electrode 61 and the second electrode 62 via the first cable 64a and the second cable 64b. When a potential difference between the first electrode 61 and the second electrode 62 becomes equal to or higher than a prescribed threshold value, discharge is induced near the first electrode 61. Electrons and ions generated at this time are driven by an electric field to collide with gas molecules, and a kinetic momentum shifts to the gas molecules. Consequently, a plasma induced flow is generated near the first electrode 61.

[C-2] Case when a Thundercloud has Approached the Wind Power Generation System 10

Next, the case when a thundercloud has approached the wind power generation system 10 will be explained.

When the first electrode 61 of the airflow generation device 60 has a ground potential in the case when a thundercloud has approached the wind power generation system 10, the first electrode 61 sometimes functions as a lightning receiving part similarly to the receptor 70 to be struck by lightning. The first electrode 61 of the airflow generation device 60 is not structured on assumption that it functions as a lightning receiving part. Therefore, when the first electrode 61 receives a direct lightning strike and a large current flows therethrough, it sometimes melts to be damaged. Additionally, the dielectric 63 in the vicinity of the first electrode 61 is sometimes damaged.

For example, when a negatively-charged thundercloud has approached, positive electric charges are supplied from the ground, resulting in that the receptor 70 and the first electrode 61 have a positive induced potential. Consequently, a stepped leader to which positively-charged streamers travel from an edge portion of the first electrode 61 is generated. As a result, a probability of inducing lightning increases.

However, in this embodiment, not a ground potential but a floating potential exists between the secondary side of the transformer 82 and the airflow generation device 60, as described above.

Therefore, in this embodiment, it is possible to effectively prevent lightning from striking the airflow generation device 60.

[C-3] Case when the Receptor 70 of the Wind Power Generation System 10 has Received Lightning Next, the case when the receptor 70 of the wind power generation system 10 has received lightning will be explained.

In this case, a current of lightning of several ten kA, for example, flows to the ground from the receptor 70 via the lightning conductor 73. That is, the current of lightning flows to the ground via the cable 71, the connection part 74, and the pull-down conductor 72 sequentially.

At this time, in this embodiment, a large induced voltage is generated in the first cable 64a and the second cable 64b due to the current of lightning flowing through the cable 71.

The magnitude of the induced voltage is in inverse proportion to the distance to the cable 71. In this embodiment, the distance between the first cable 64a and the cable 71 and the distance between the second cable 64b and the cable 71 are nearly equal as described above. Therefore, a potential in the first cable 64a and a potential in the second cable 64b increase so as to be substantially the same potential as each other. That is, a common mode is induced.

However, in this embodiment, the first lightning arrester element 91 and the second lightning arrester element 92 each protect the transformer 82 from an increase in voltage in this common mode.

Specifically, the first lightning arrester element 91 has one end thereof electrically connected to the first cable 64a and has the other end thereof grounded as described above. Then, the second lightning arrester element 92 has one end thereof electrically connected to the second cable 64b and has the other end thereof grounded as described above. The first lightning arrester element 91 and the second lightning arrester element 92 each operate in a state where the voltage to be applied is equal to or less than the impulse withstand voltage of the transformer 82 to turn into a continuity state. Therefore, the first lightning arrester element 91 and the second lightning arrester element 92 each turn into a continuity state before the voltage to increase in the common mode exceeds the impulse withstand voltage of the transformer 82, so that it is possible to limit an increase in the potential of the first cable 64a and an increase in the potential of the second cable 64b. Consequently, it is possible to effectively protect the transformer 82 in this embodiment.

As described above, the impulse operating voltage V91i of the first lightning arrester element 91 and the impulse operating voltage V92i of the second lightning arrester element 92 are preferably the same as each other (namely, V91i=V92i). However, the impulse operating voltage V91i of the first lightning arrester element 91 and the impulse operating voltage V92i of the second lightning arrester element 92 sometimes have variations stochastically to be different from each other. When the first lightning arrester element 91 and the second lightning arrester element 92 are a spatial sphere gap arrester in particular, a spatial breakdown voltage sometimes varies largely according to the surface state of the sphere and the state to supply electrons to the space from the sphere. Consequently, there is sometimes a case that both the first lightning arrester element 91 and the second lightning arrester element 92 do not operate simultaneously and either of them operates early.

For example, when the second lightning arrester element 92 operates earlier than the first lightning arrester element 91 and the first lightning arrester element 91 is in an insulating state, the second lightning arrester element 92 sometimes turns into a continuity state. When both the first lightning arrester element 91 and the second lightning arrester element 92 do not operate and are in an insulating state, a potential difference between the first cable 64a and the second cable 64b is small and no large potential difference is generated between the first electrode 61 and the second electrode 62. In contrast to this, when the second lightning arrester element 92 turns into a continuity state earlier than the first lightning arrester element 91 as described above, the potential of the second electrode 62 changes into a ground potential from substantially the same potential as that of the first electrode 61. Consequently, a large potential difference is generated between the first electrode 61 and the second electrode 62. That is, a normal-mode voltage is applied between the first electrode 61 and the second electrode 62.

Then, when the normal-mode voltage generated between the first electrode 61 and the second electrode 62 exceeds a withstand voltage of the dielectric 63, dielectric breakdown is sometimes caused in the dielectric 63 to damage the airflow generation device 60.

However, in this embodiment, the third lightning arrester element 93 protects the airflow generation device 60 from the above-described generation of the normal-mode voltage.

Specifically, the third lightning arrester element 93 has one end thereof electrically connected to the first electrode 61 via the first cable 64a and has the other end thereof electrically connected to the second electrode 62 via the second cable 64b as described above. The third lightning arrester element 93 operates when the voltage to be applied is less than the impulse withstand voltage of the dielectric 63 of the airflow generation device 60, to turn into a continuity state from an insulating state. Therefore, the third lightning arrester element 93 turns into a continuity state before the normal-mode voltage exceeds the impulse withstand voltage of the dielectric 63 of the airflow generation device 60, so that it is possible to limit an increase in a potential difference between the first cable 64a and the second cable 64b. Consequently, in this embodiment, it is possible to effectively protect the airflow generation device 60 without a large normal-mode voltage being applied to the dielectric 63 of the airflow generation device 60.

As above, since the wind power generation system 10 according to the embodiment has the first lightning arrester element 91, the second lightning arrester element 92, and the third lightning arrester element 93, it is possible to effectively protect both the transformer 82 and the airflow generation device 60 from an induced voltage to be generated when the receptor 70 receives lightning. Consequently, it is possible to further enhance the safety of the wind power generation system 10.

[D] Modified Examples

In the above-described embodiment, the wind power generation system 10 including the airflow generation devices 60 has been explained, but this is not restrictive. In a wind power generation system in which electric devices other than the airflow generation devices 60 are installed at the blade 42, the first lightning arrester elements 91, the second lightning arrester elements 92, and the third lightning arrester elements 93 may also be installed in the same manner as in the case of the above-described embodiment. When the electric devices are an active device such as a heating device or an acoustic generation device and a measurement device such as a distortion sensor or a temperature sensor, for example, or the like, the wind power generation system may also be constituted as described above.

Further, although the case where the discharge power supply 65 has the first lightning arrester element 91, the second lightning arrester element 92, and the third lightning arrester element 93 has been explained in the above-described embodiment, this is not restrictive. The discharge power supply 65 does not have to have the third lightning arrester element 93.

According to at least one of the embodiments explained above, it is possible to accurately protect the electric devices and the like installed at the blade from lightning strikes and improve the safety.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wind power generation system comprising:
a blade;
a lightning protection device including a receptor provided at the blade and guiding a current of lightning to the ground from the receptor via a lightning conductor;
an electric device installed at the blade and including a first electric conductor and a second electric conductor provided apart from each other;
a voltage application mechanism for applying a voltage between the first electric conductor and the second electric conductor;
a first lightning arrester element having one end thereof electrically connected to the first electric conductor and having the other end thereof grounded;
a second lightning arrester element having one end thereof electrically connected to the second electric conductor and having the other end thereof grounded; and
a third lightning arrester element having one end thereof electrically connected to the first electric conductor and having the other end thereof electrically connected to the second electric conductor.

2. The wind power generation system according to claim 1,
wherein the electric device is an airflow generation device having a first electrode, a second electrode, and a dielectric,
wherein the first electrode is provided as the first electric conductor,
wherein the second electrode is provided as the second electric conductor,
wherein the first electrode and the second electrode are separated via the dielectric, and
wherein the voltage application mechanism applies a voltage between the first electrode and the second electrode, to thereby make the airflow generation device generate an airflow.

3. The wind power generation system according to claim 2,
wherein the first electrode and the second electrode each have a floating potential.

4. The wind power generation system according to claim 1,
wherein the first lightning arrester element, the second lightning arrester element, and the third lightning arrester element each are a sphere gap arrester.

* * * * *